United States Patent [19]
Janssen

[11] Patent Number: 6,052,165
[45] Date of Patent: Apr. 18, 2000

[54] REFLECTIVE LIQUID CRYSTAL DISPLAY (LCD) DEVICE HAVING AN INTERNAL REFLECTION REDUCER

[75] Inventor: Peter J. Janssen, Scarborough, N.Y.

[73] Assignee: Philips Electronics North America Corporation, New York, N.Y.

[21] Appl. No.: 08/995,822

[22] Filed: Dec. 22, 1997

[51] Int. Cl.[7] .................................................. G02F 1/1333
[52] U.S. Cl. .............................................. 349/84; 349/158
[58] Field of Search .................................... 349/110, 111, 349/84, 158

[56] References Cited

U.S. PATENT DOCUMENTS

| | | | |
|---|---|---|---|
| 3,924,932 | 12/1975 | Yamamoto | 350/160 |
| 4,239,346 | 12/1980 | Lloyd | 340/334 |
| 4,529,272 | 7/1985 | Kruger et al. | 349/137 |
| 5,056,895 | 10/1991 | Kahn | 359/87 |
| 5,243,260 | 9/1993 | Vinouze et al. | 349/110 |
| 5,276,538 | 1/1994 | Monji et al. | 349/84 |
| 5,365,355 | 11/1994 | Hastings, III et al. | 349/110 |
| 5,377,031 | 12/1994 | Vu et al. | 349/110 |
| 5,399,390 | 3/1995 | Akins | 428/1 |
| 5,467,208 | 11/1995 | Kokawa et al. | 349/67 |
| 5,555,240 | 9/1996 | Nishi et al. | 349/158 |
| 5,568,291 | 10/1996 | Murata et al. | 349/158 |
| 5,623,280 | 4/1997 | Akins et al. | 349/158 |
| 5,654,782 | 8/1997 | Morokawa et al. | 349/143 |
| 5,701,165 | 12/1997 | Kubo et al. | 349/5 |

*Primary Examiner*—William L. Sikes
*Assistant Examiner*—Tarifur R. Chowdhury
*Attorney, Agent, or Firm*—Steven R. Biren

[57] ABSTRACT

A reflective liquid crystal display (LCD) device includes an array of reflective pixel electrodes over a surface of a silicon substrate, with light transmissive regions being located between the reflective pixel electrodes. A nematic liquid crystal layer is provided over both the reflective pixel electrodes and the light transmissive regions between the reflective pixel electrodes. A reflection reducer is provided for reducing the percentage of light entering the device through the nematic crystal layer and the light transmissive regions which is reflected back out of the device through the light transmissive regions and the nematic liquid crystal layer. In one form, the reflection reducer is a vee-shaped groove in the substrate which is provided with a vee-shaped layer of low reflectivity. Alternatively, the reflection reducer may be provided by having modules of the nematic liquid crystal layer aligned in a direction at an angle of about 45° to the axis of the reflective pixel electrodes when the LCD device is in a bright state. A third possibility is to combine both of the foregoing features in a single device. In this manner, light reflection from the inter-pixel areas back in the viewing direction is reduced, and contrast is improved, without the need for a light shield.

8 Claims, 2 Drawing Sheets

REFLECTIVE LIQUID CRYSTAL DISPLAY (LCD) DEVICE HAVING AN INTERNAL REFLECTION REDUCER

BACKGROUND OF THE INVENTION

The invention is in the field of liquid crystal display (LCD) devices, and relates more particularly to the reduction of unwanted reflections from inter-pixel areas of such devices.

Reflective LCD devices per se are known to those of ordinary skill in this art. Examples of such devices, and in particular active matrix devices, are shown in U.S. Pat. Nos. 4,239,346 and 5,056,895, as well as in co-pending U.S. patent application Ser. No. 08/995,824, filed concurrently herewith and in which the present inventor is a co-inventor. With reference to the following description, familiarity with conventional features of such devices will be assumed, so that only features bearing on the present invention will be described. Accordingly, the content of the aforementioned patents and application are incorporated herein by reference in their entirety, in the interest of brevity.

A problem prevalent in prior-art devices is that, in the activated or dark state, light may be reflected in light transmissive regions between the pixel electrodes, due to the presence of a reflective material beneath the light transmissive regions between the pixel electrodes. Such light is reflected back in the viewing direction, and reduces the contrast of the image being displayed because bright regions are created in regions between reflective pixels which are in the dark state. While this problem could be solved by a light shield placed on the upper glass layer of the LCD device, precisely aligned with the underlying inter-pixel regions, such a solution would be costly, complex, and would demand a very precise alignment of the light shield with the light transmissive or inter-pixel regions.

Accordingly, it would be desirable to reduce or minimize light reflection in the inter-pixel areas of an LCD device without the need for a costly, high-precision and complex light shield.

SUMMARY OF THE INVENTION

It is therefore an object of the invention to provide a reflective LCD device with a reflection reducer which does not require the use of a complex, costly and high-precision light shield over the inter-pixel areas.

In accordance with the invention, this object is achieved in a reflective LCD device of the type described above in which a reflection reducer is provided for reducing the percentage of light entering the device through the nematic liquid crystal layer and the light transmissive regions which is reflected back out of the device through the light transmissive regions and the nematic liquid crystal layer.

In a preferred embodiment of the invention, the reflection reducer includes a vee-shaped groove in the substrate of the LCD device which is provided with a vee-shaped layer of low reflectivity.

In a further preferred embodiment of the device, reflection reduction is provided by using rectangular (typically square) reflective pixel electrodes whose edges define two mutually-perpendicular axes, and providing a nematic liquid crystal layer whose molecules are aligned in a direction at an angle of about 45° to these axes when the LCD is in a bright state.

In yet a further preferred embodiment of the invention, both the vee-shaped groove and the nematic liquid crystal layer molecular alignment features are combined in a single device.

Reflective LCD devices in accordance with the present invention offer a significant improvement over the prior art, in that contrast in the dark state is substantially improved without using a costly, complex and high-precision light shield.

These and other aspects of the invention will be apparent from and elucidated with reference to the embodiments described hereinafter.

BRIEF DESCRIPTION OF THE DRAWING

The invention may be more completely understood with reference to the following description, to be read in conjunction with the accompanying drawing, in which.

In the drawing, like regions are generally provided with like reference numerals in the different figures, and should be recognized that the figures are not drawn to scale.

DESCRIPTION OF THE PREFERRED EMBODIMENTS

Figure 1:
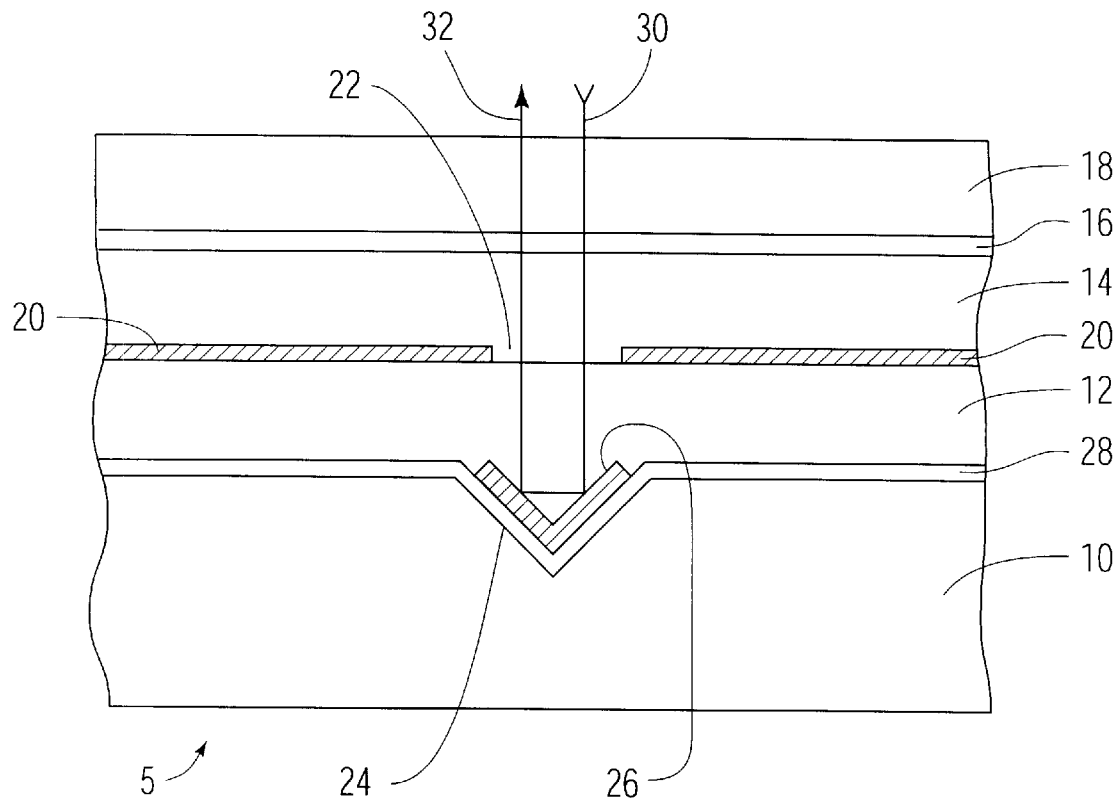
FIG. 1 shows a simplified cross-sectional view of a portion of a reflective LCD device in accordance with a first embodiment of the invention.

A portion of a reflective LCD device 5 in accordance with a first embodiment of the invention is shown in a simplified cross-sectional view in FIG. 1. For clarity, only those portions of the device relating to the present invention are shown, as the remaining portions of the device are of a conventional nature, well known to those of ordinary skill in the art and illustrated in the prior-art references cited above. Additionally, for clarity, only certain selected portions of the device shown in FIG. 1 are shown hatched, with the remainder of the structure being shown in simplified, outline form.

The basic structure of the device shown in FIG. 1 is composed of a silicon substrate 10, above which are successively provided an insulating layer 12, a nematic liquid crystal layer 14, an ITO electrode 16 and a glass layer 18. An array of reflective pixel electrodes 20 is provided between the liquid crystal layer 14 and the insulating layer 12, with light transmissive regions 22 being located between the reflective pixel electrodes 20. The portions of the device shown in FIG. 1 as so far described are of a conventional nature, and are accordingly not described in further detail as their form and construction will be known to those of ordinary skill in the art.

In accordance with a first embodiment of the invention, the reflective LCD device 5 of FIG. 1 also includes a vee-shaped groove 24 in the substrate 10 in which is provided a vee-shaped layer 26, advantageously typically of a relatively low reflectivity material. Since the layer 26 may be formed of a material which is also conductive, such as polysilicon or even metal, an insulating layer 28 is provided above the substrate 10 in order to insulate the substrate from the vee-shaped layer 26 and thereby prevent any undesired current from flowing between these two elements. Additionally, it should be noted that, by placing the vee-shaped layer 26 beneath the light transmissive regions 22 between the reflective pixel electrodes 20, light entering the device through the light transmissive regions is substantially prevented from reaching the substrate 10, thereby preventing unwanted leakage currents from being induced in the substrate.

In the device shown in FIG. 1, a relatively low reflectivity is obtained in the layer 26 by forming this layer as a vee-shaped layer, so that light rays 30 entering the device through light transmissive regions 22 is reflected (and thus attenuated) twice by the vee-shaped layer 26 before being directed back out of the device through light transmissive regions 22, as shown by light rays 32 in FIG. 1. In this manner, twice as much attenuation is provided as would be the case with a conventional flat layer beneath the light transmissive regions, so that, even if the vee-shaped layer 26 is formed of metal or other relatively high reflectivity material, a lower reflectivity will be obtained than in prior-art devices. However, in a preferred embodiment of the invention, the vee-shaped layer 26 may advantageously be made of polysilicon, in order to further reduce the reflectivity of this layer.

A further reduction in reflectivity in the light path through light transmissive regions 22 may be achieved by using a material, such as black polyimide, for the insulating layer 12, in order to provide a further double attenuation of light entering (30) and leaving (32) the device through the light transmissive regions 22.

Figure 2:
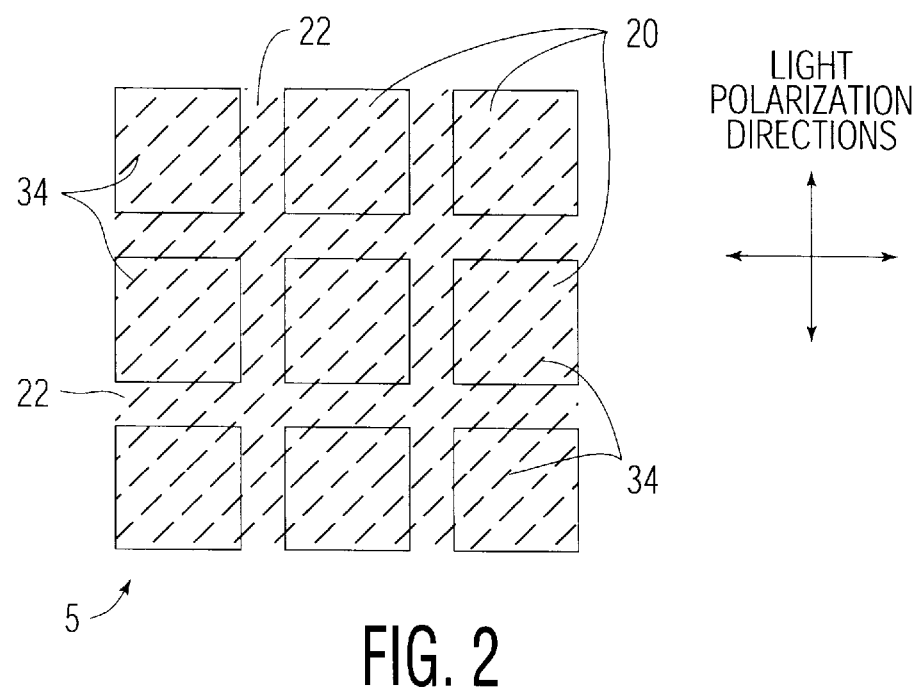
FIG. 2 shows a representational simplified plan view of a portion of a reflective LCD device in accordance with a second embodiment of the invention in the bright state.
Figure 3:
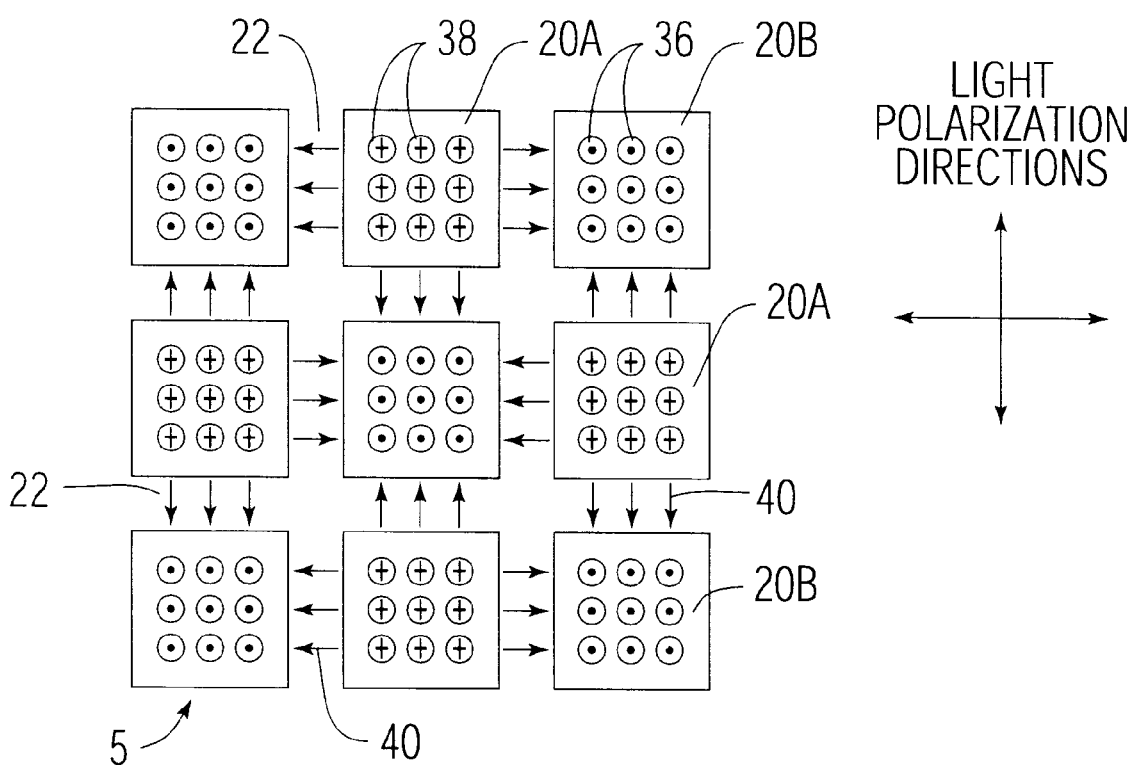
FIG. 3 shows a representational simplified plan view of a portion of a reflective LCD device in accordance with the second embodiment of the invention in the dark state.

In accordance with a further preferred embodiment of the invention, as illustrated in the simplified plan views of FIGS. 2 and 3, nematic liquid crystal layer 14 is provided with a molecular orientation in the bright state (no voltage applied to the electrodes) such that the inter-pixel areas (light transmissive regions 22) will be in the dark state when voltage is applied to the reflective pixel electrodes 20 in accordance with the invention.

In FIG. 2, there is shown a highly-simplified representational view of a number of reflected pixel electrodes 20 of LCD device 5, separated by inter-pixel light transmissive regions 22, with the reflective pixel electrodes being of rectangular (here square) shape so that their edges define two mutually-perpendicular axes, which correspond to the vertical and horizontal directions in the plan view of FIG. 2. Also shown in FIG. 2, in a representative manner, is the molecular alignment of the nematic liquid crystal layer (14 in FIG. 1) in a direction at an angle of about 45° to the axes of the reflective pixel electrodes 20 in the bright state with no voltage applied to the reflective pixel electrodes. In FIG. 2, this molecular alignment is represented by the dashed lines 34 extending in a direction at an angle of about 45° to the vertical and horizontal axes of the reflective pixel electrode edges.

As is well known in the art, modulation of light in a reflective LCD device is achieved by changing the polarization state of the reflected light in the device. More particularly, the polarization state of the light entering the device changes (twice due to the reflective path) as it traverses the highly birefringent liquid crystal layer 14. For a bright display portion, no electrical field is applied and the polarization is rotated 90°, whereas for a dark display portion, a vertically-oriented electrical field is applied to the reflective pixel electrodes, causing the effective birefringence of the liquid crystal layer to be reduced and consequently, for the polarization change to be reduced. At high electrical field levels, the birefringence approaches zero, producing a dark state in the device. Typically, such devices are operating in conjunction with a prepolarizer to provide an initial polarization, and a polarizing beam splitter to provide a visible light output from the display when the polarization within the display is rotated 90° in the bright state, and to deflect the reflected light away from the visible output direction in the dark state.

Thus, for vertical and horizontal light polarization directions, as shown in FIGS. 2 and 3, a 45° molecular orientation of the liquid crystal layer will produce the desired 90° polarization rotation to achieve the bright display state with no voltage applied to the reflective pixel electrodes 20.

FIG. 3 shows a simplified representation of the molecular and field alignments in the reflective LCD device 5 in the active, or dark, state, in which voltage is applied to the reflective pixel electrodes. In accordance with the invention, FIG. 3 illustrates the condition in which voltages of alternate polarity are applied to alternate pixel electrodes 20, to cause a molecular alignment in the nematic liquid crystal layer 14 in a direction perpendicular to the plane of FIG. 3, with the molecules above alternate electrodes 20A and 20B being aligned in the same direction, but 180° out of phase, as shown by the circles containing either dots or crosses above electrodes 20B and 20A, respectively, and designated with reference numerals 36 and 38 in FIG. 3. Due to the creation of a vertically-oriented electrical field, due to the application of voltage to the pixel electrodes, the effective birefringence of the liquid crystal layer is reduced, and, consequently, the polarization change is reduced, approaching zero and producing a dark state at high fields.

At the same time, a strong in-plane field component 40 is created in the inter-pixel regions 22 due to the use of opposite polarity voltages being applied to alternate pixel electrodes, an operating state known as the pixel inversion mode. As a result, the birefringence of the liquid crystal layer in the inter-pixel areas 22 is maximized, rather than minimized as in the case inside the pixel area. By selecting the polarization of incident light in a direction parallel to one of the mutually-perpendicular axes of the pixel electrodes, as shown in FIG. 3, the molecular orientation in the inter-pixel areas of the liquid crystal will be oriented with respect to the light polarization directions in such a manner that the inter-pixel areas will also be in the dark state.

In a further preferred embodiment of the invention, contrast can be further improved by combining the vee-shaped layers of FIG. 1 with the liquid crystal orientation and voltage application scheme as shown in FIGS. 2 and 3 in the same device.

In this manner, the present invention provides a reflective LCD device with improved contrast without resorting to the expensive and complex expedient of providing a precisely-aligned light shield over the glass layer.

While the invention has been particularly shown and described with reference to several preferred embodiments thereof, it will be understood by those skilled in the art that various changes in form and detail may be made without departing from the spirit or scope of the invention.

What is claimed is:

1. A reflective liquid crystal display (LCD) device comprising an array of reflective pixel electrodes over a surface of a silicon substrate, with light transmissive regions being located between said reflective pixel electrodes, and a nematic liquid crystal layer over said reflective pixel electrodes and said light transmissive regions, characterized in that said LCD device comprises an internal reflection reducer for reducing the percentage of light entering the device through said nematic liquid crystal layer and said light transmissive regions which is reflected back out of the device through said light transmissive regions and said nematic liquid crystal layer, said internal reflection reducer being located substantially only at said light transmissive regions.

2. An LCD device as in claim 1, wherein said reflection reducer comprises a vee-shaped groove in said substrate and provided with a vee-shaped layer of low reflectivity.

3. An LCD device as in claim 2, wherein said vee-shaped layer of low reflectivity is provided on an insulating layer which insulates said vee-shaped layer from said substrate.

4. An LCD device as in claim 3, wherein said vee-shaped layer of low reflectivity comprises polysilicon.

5. An LCD device as in claim 4, further comprising black polyimide provided between said reflective pixel electrodes and said silicon substrate.

6. An LCD device as in claim 1, wherein said reflection reducer comprises said reflective pixel electrodes being of rectangular shape so that their edges define two mutually-perpendicular axes, and molecules of said nematic liquid crystal layer being aligned in a direction at an angle of about 45° to said axes when said LCD device is in a bright state.

7. An LCD device as in claim 6, wherein voltages of alternate polarity are applied to alternate pixel electrodes in a dark state of the device.

8. An LCD device as in claim 1, wherein said reflection reducer comprises both a vee-shaped groove in said substrate and provided with a vee-shaped layer of low reflectivity and said reflective pixel electrodes being of rectangular shape so that their edges define two mutually-perpendicular axes, and molecules of said nematic liquid crystal layer being aligned in a direction at an angle of about 45° to said axes when said LCD device is in a bright state.

* * * * *